United States Patent [19]

Yang

[11] Patent Number: 4,722,115
[45] Date of Patent: Feb. 2, 1988

[54] MULTI-RING TYPE LEG-WHEEL

[76] Inventor: Yu-Sung Yang, No. 1, Sec 4, Tzyh-Chiarng Rd., San-Chorng, Taiwan

[21] Appl. No.: 923,186

[22] Filed: Oct. 27, 1986

[51] Int. Cl.⁴ .................................................. B60B 7/00
[52] U.S. Cl. .......................................... 16/45; 446/465
[58] Field of Search ............... 16/45, 46, 47; 301/5.3, 301/69 PW, 108 A, 111, 122; 446/25, 78, 465

[56] References Cited

U.S. PATENT DOCUMENTS

| | | | |
|---|---|---|---|
| 2,061,145 | 11/1936 | Duffy | 301/108 A |
| 2,978,277 | 4/1961 | Gaudry | 301/63 PW |
| 3,566,536 | 3/1971 | Baynes et al. | 446/465 |
| 3,638,356 | 2/1972 | LaBranche | 446/465 |
| 3,909,066 | 9/1975 | Snowden | 301/63 PW |

*Primary Examiner*—M. Jordan

[57] ABSTRACT

A multi-ring type leg-wheel comprises a leg-wheel outer ring, a inner ring, and a center cap. The leg-wheel outer ring has a wheel configuration with a shaft support ring located in the middle portion of the leg-wheel outer ring, and there are a plurality of tapered-section hooks equally spaced around the circumference of the shaft support ring. On the outer side of the leg-wheel outer ring, there is cylindrical concaved space. The inner ring has a ring-like configuration; and from the immediate circumference of inner circle of inner ring, there extend a plurality of circumferentially equally spaced cantilever type claws along the axial direction. At the end of each claw, there is a tapered section hook along the claw's width. The center cap has a short barrel shape and it's diameter is equal to the diameter of center hollow space of the inner ring.

1 Claim, 10 Drawing Figures

MULTI-RING TYPE LEG-WHEEL

BACKGROUND OF THE INVENTION

The present invention is an improvement of the traditional leg-wheel for table, chair, or movable-bed use. In the past, the leg-wheel had been manufactured in one piece and in one color by injection-molding method. Recently, there is a need of ring-like, multi-color appearance for the outer side surface of the leg-wheel. Painting or coating method has been used to achieve said goal. However, the result of said method is not quite satisfactory. In one respect, the painting or coating process on the outer side surface of said leg-wheel are complicated and laborious. In another respect, the colorful ring-like layer has been proven to be fading away easily after a certain amount of time.

SUMMARY OF THE INVENTION

In view of the aforesaid defects, the object of the invention is therefore to provide a multi-ring type leg-wheel in which 1. The leg-wheel has been manufactured by assembling ring-type components and center cap which are made by injection molding method.
2. The colors of the ring-type components and center cap are selected and pre-set during the plastic material preparation period of the injection molding process.
3. The connection portions between the ring-type components, and that between ring-type component and cap are such as the leg-wheel assembly process is very easy and is possible without any tool.

The present invention mainly comprises a leg-wheel outer ring, a inner ring, and a center cap. The leg-wheel outer ring has a wheel configuration with a shaft support ring located in the middle portion of the wheel. The wheel and shaft support ring have same central axis. The leg-wheel outer ring is characterized by the concaved design of the outer side surface of the leg-wheel outer ring, as to the concaved space will accommodate a inner ring. Furthermore, on the outer side end of the shaft support ring, there are four tapered-section hooks equally spaced around the circumference. The inner ring has a ring-like configuration, having a outer diameter equal to the diameter of the concavity of the leg-wheel outer ring. And the center hollow space of inner ring will accommodate a center cap. From the immediate circumference of inner circle of inner ring, there extend four equally spaced cantilever-type claws along the axis direction. At the end of each claw, there is a tapered-section hook along the claw's width. When the leg-wheel outer ring and inner ring are to be assembled together, press the inner ring into the concaved space of the leg-wheel outer ring. The above components will be hooked together tightly because of the hook configuration each has. The center cap has a short barrel shape with the diameter equal to that of the center hollow space of inner ring. The thickness of the circumference wall is thin and flexible as to the center cap can be pressed into the center hollow space of inner ring.

DETAILED DESCRIPTION OF A PREFERRED EMBODIMENT

Figure 1A:
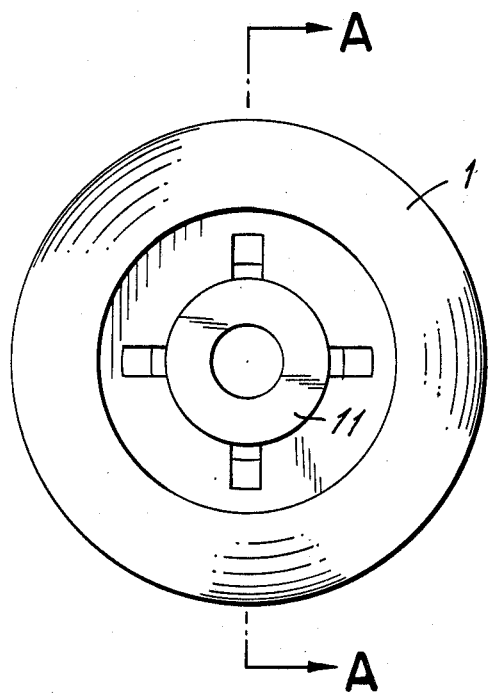
FIGS. 1A, 1B, 1C, 1D, 1E, and 1F are orthographic and cross-sectional views of each components of the present invention.
Figure 1B:
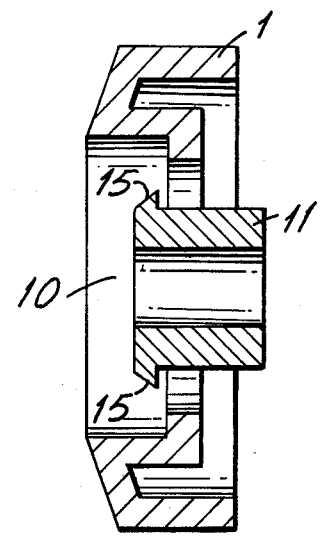
Figure 1C:
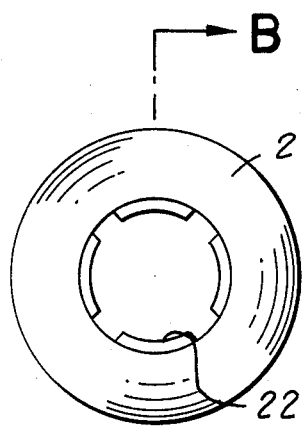
Figures 1D, 1E, 1F:
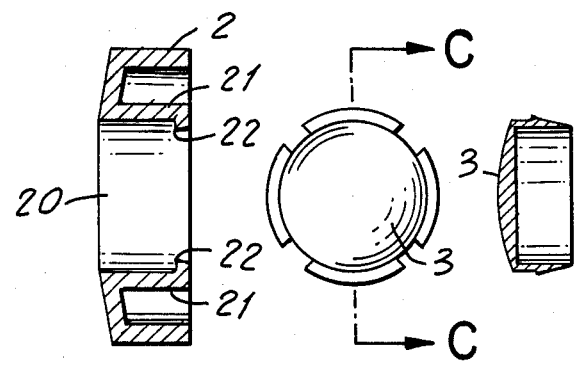

As shown in the attached drawings, the present invention comprises mainly a leg-wheel outer ring 1, a inner ring 2, and a center cap 3. The leg-wheel outer ring has a wheel configuration with a shaft support ring 11 located in the middle portion of the leg-wheel outer ring 1. The leg-wheel outer ring 1 and shaft support ring 11 have same central axis. On the outer side of the leg-wheel outer ring 1, there is a cylindrical concaved space 10 which will accommodate the inner ring 2. On the outer side end of the shaft support ring 11, there are four tapered section hooks 15 equally spaced around the circumference of the shaft support ring 11 (FIG. 1).

Figure 2:
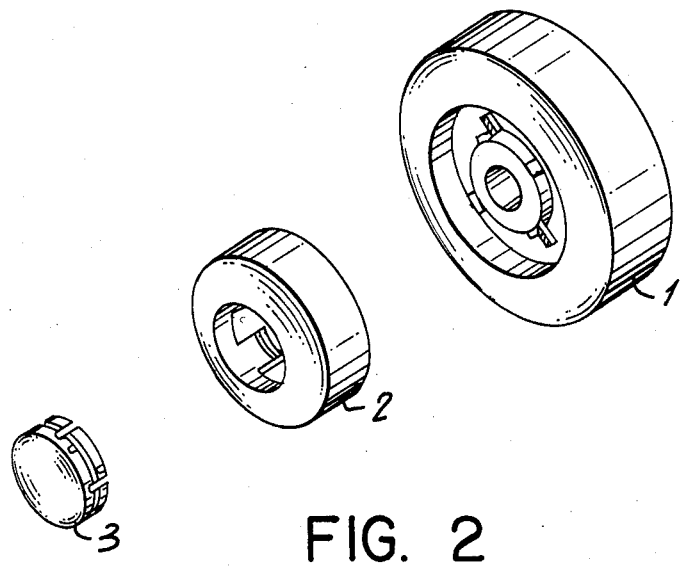
FIG. 2 is explosive isometric view of present invention.
Figure 3:
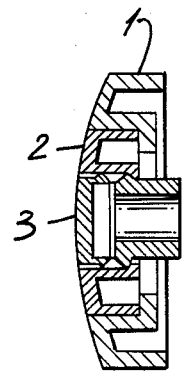
FIG. 3 is the cross-section view of present invention when assembled.

The inner ring 2, having the outer diameter equal to the diameter of cylindrical concaved space 10 of the leg-wheel outer ring 1, has a ring-like configuration. And the center hollow space 20 of inner ring 2 will accommodate the center cap 3. From the immediate circumference of the inner circle of the inner ring 2, there extend four circumferentially equally spaced cantilever-type claws 21 along the axis direction. At the end of each claw 21, there is a tapered-section hook 22 along the claw's width (FIG. 1). Because the design of tapered section hook 22 of each claw 21 and the design of hook 15 of the shaft support ring 11, when the inner ring 2 is pressed into the cylindrical concaved space 10, the inner ring 2 will be hooked tightly with the leg-wheel outer ring 1 (FIG. 2, FIG. 3).

The center cap 3 has a short barrel shape with the diameter equal to that of the center hollow space 20 of the inner ring 2. The thickness of the circumference wall of the cap 3 is thin and flexible as to the center cap 3 can be pressed into the center hollow space 20 of the inner ring 2 (FIG. 2, FIG. 3)

Figure 4:
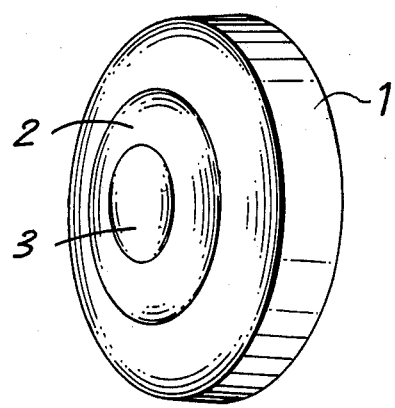
FIG. 4 is the appearance of present invention after assembly.
Figure 5:
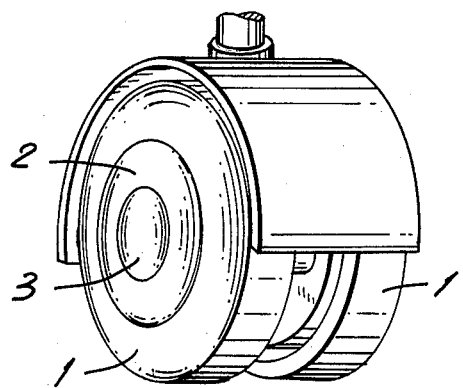
FIG. 5 is the appearance of present invention when used.

The present invention will have a multi-ring appearance on the outer side surface when assembled together and used as leg-wheel (FIG. 4, FIG. 5).

I claim:
1. A multi-ring type leg-wheel comprising
a leg-wheel outer ring, having a wheel configuration with a shaft support ring located in the middle portion of said leg-wheel outer ring; on the outer side end of said shaft support ring, there are a plurality of tapered-section hooks equally spaced around the circumference of said shaft support ring; on the outer side of said leg-wheel outer ring, there is cylindrical concaved space;
a inner ring, having a ring-like configuration, its outer diameter being equal to the diameter of said cylindrical concaved space; from the immediate circumference of the inner circle of said inner ring, there extend a plurality of circumferentially equally spaced cantilever-type claws along the axial direction; at the end of each claw, there is a tapered section hook along said claw's width; said claws and said hooks of shaft support ring are hooked together when said inner ring are pressed into said cylindrical concaved space of said leg-wheel outer ring;
a center cap, having a short barrel shape with the diameter equal to diameter of center hollow space of said inner ring, said center cap being pressed into said center hollow space of said inner ring and having interference fit therebetween.

* * * * *